US010489791B2

(12) United States Patent
Wong et al.

(10) Patent No.: US 10,489,791 B2
(45) Date of Patent: *Nov. 26, 2019

(54) VIRTUAL RECEPTIONIST SYSTEM (71) Applicant: RICOH COMPANY, LTD., Tokyo OT (JP)

(72) Inventors: Lana Wong, Randolph, NJ (US);
Hiroshi Kitada, Tuckahoe, NY (US);
Steven A. Nelson, San Jose, CA (US);
T J Tsai, Burlingame, CA (US)

(73) Assignee: RICOH COMPANY, LTD., Tokyo (JP)

( * ) Notice: Subject to any disclaimer, the term of this patent is extended or adjusted under 35 U.S.C. 154(b) by 759 days.

This patent is subject to a terminal disclaimer.

(21) Appl. No.: 14/790,957

(22) Filed: Jul. 2, 2015

(65) Prior Publication Data
US 2017/0004510 A1  Jan. 5, 2017

(51) Int. Cl.
*G06Q 30/00* (2012.01)
*G06Q 30/02* (2012.01)
*H04L 29/08* (2006.01)

(52) U.S. Cl.
CPC ....... *G06Q 30/016* (2013.01); *G06Q 30/0281* (2013.01); *H04L 67/14* (2013.01);
(Continued)

(58) Field of Classification Search
CPC ...... G06Q 10/00; G06Q 10/10; G06Q 10/101; G06Q 10/1095; G06Q 30/0281;
(Continued)

(56) References Cited

U.S. PATENT DOCUMENTS 6,731,609 B1 * 5/2004 Hirni .................. H04L 12/1813
370/260
6,771,766 B1 * 8/2004 Shafiee ............... H04M 3/5191
379/265.09

(Continued)

OTHER PUBLICATIONS

"What is ADSL load balancing?", Increase Broadband speed, May 12, 2012, https://web.archive.org/web/20120512184905/https://www.increasebroadbandspeed.co.uk/what-is-adsl-load-balancing (Year: 2012).*

(Continued)

*Primary Examiner* — Gerardo Araque, Jr.
(74) *Attorney, Agent, or Firm* — Hickman Palermo Becker Bingham LLP; Edward A. Becker (57) ABSTRACT

A method and apparatus for providing a synchronous communication session comprising a customer service session and a video conferencing session are provided. The customer service session is established by a distribution service in response to a request received from a cabinet application that is geographically remote from a virtual receptionist application. The request includes a computer identifier of the cabinet application that is then used by the virtual receptionist application to request a video conferencing session from a video conferencing service that is separate from the distribution service. During the synchronous communication session, the virtual receptionist can cause a display at the cabinet application to display a screen at the virtual receptionist application.

20 Claims, 6 Drawing Sheets (52) U.S. Cl.
CPC ............ *H04L 67/141* (2013.01); *H04L 67/22* (2013.01); *H04L 67/32* (2013.01)

(58) Field of Classification Search
CPC ..... G06Q 30/016; H04L 67/025; H04L 67/14; H04L 67/02; H04L 12/1813; H04L 12/1822; H04L 67/32; H04L 67/141; H04L 67/22
See application file for complete search history.

(56) References Cited

U.S. PATENT DOCUMENTS

| | | | | |
|---|---|---|---|---|
| 8,238,532 B1* | 8/2012 | Cox | ...................... | H04M 15/06 379/114.14 |
| 8,767,592 B1* | 7/2014 | Sojka | .................. | H04L 12/1818 370/259 |
| 2001/0016873 A1* | 8/2001 | Ohkado | .................. | G06F 9/465 709/205 |
| 2003/0093430 A1* | 5/2003 | Mottur | ................ | H04N 5/23203 |
| 2003/0197615 A1* | 10/2003 | Roche | ...................... | G08B 21/22 340/573.1 |
| 2004/0039846 A1* | 2/2004 | Goss | ........................ | H04L 29/06 709/248 |
| 2004/0199649 A1* | 10/2004 | Tarnanen | ................ | H04L 29/06 709/230 |
| 2005/0044197 A1* | 2/2005 | Lai | ........................ | G06Q 10/10 709/223 |
| 2005/0267778 A1* | 12/2005 | Kazman | ................ | G06Q 10/00 705/26.1 |
| 2006/0098624 A1* | 5/2006 | Morgan | ............ | H04L 29/06027 370/352 |
| 2006/0223712 A1* | 10/2006 | Vinarov | ................ | H04M 15/00 505/126 |
| 2012/0266258 A1* | 10/2012 | Tuchman | .............. | H04L 63/104 726/28 |
| 2014/0108557 A1* | 4/2014 | Calman | ................ | G06Q 10/101 709/205 |
| 2014/0156537 A1* | 6/2014 | Vieira | .................. | G06Q 30/016 705/304 |
| 2016/0127683 A1* | 5/2016 | Hanson | .................... | H04N 7/15 348/14.08 |
| 2017/0004546 A1 | 1/2017 | Wong | | |

OTHER PUBLICATIONS

"Advanced load balancing: 8 must-have features for today's network demands", Citrix, copyright 2009 https://www.citrix.com/content/dam/citrix/en_us/documents/white-paper/advanced-load-balancing-8-must-have-features-for-todays-network-demands.pdf ( Year: 2009).*

D. Skiba, G. Erhart, R. Kashi and V. Matula, "Dynamic video delivery in contact centers," 2008 International Symposium on a World of Wireless, Mobile and Multimedia Networks, Newport Beach, CA, 2008, pp. 1-6. (Year: 2008).*

H. Bernett and M. L. Jaramillo, "Assessing Web-enabled call center technologies," in IT Professional, vol. 3, No. 3, pp. 24-30, May-Jun. 2001. (Year: 2001).*

Wong, U.S. Appl. No. 14/790,965, filed Jul. 2, 2015, Office Action, dated Feb. 14, 2018.

Wong, U.S. Appl. No. 14/790,965, filed Jul. 2, 2015, Final Office Action, dated Aug. 13, 2018.

"What is ADSL Loading", Increase Broadband Speed, dated May 12, 2012, https://web.archive.org/web20120512184905/https://www.increasebroadbandspeed.couk/what-is-adsl-load-balancing, 4 pages.

"Advanced Load Balancing: 8 Must-have Features for Today's Network Demands", Citrix, dated 2009, https://www.citrix.com/content/dam/citrix/enjjs/documents/white-paper/advanced-load-balancing, 9 pages.

Wong, U.S. Appl. No. 14/790,965, Filed Jul. 2, 2015, Notice of Allowance dated Jul. 31, 2019.

* cited by examiner

VIRTUAL RECEPTIONIST SYSTEM

TECHNICAL FIELD

The present disclosure relates generally to digital communications and, more specifically, to establishing and managing synchronous communication sessions between remote systems.

BACKGROUND

Large campuses, such as hospitals, schools, government buildings, military bases, and large companies, can be difficult for visitors and guests to navigate. These campuses rely on a team of security staff and receptionists to maintain security, issue visitor passes, notify hosts of the visitor's arrival, direct visitors to amenities such as cafeterias or restrooms, and provide directions to buildings and locations within buildings. These teams, while effective, are expensive to staff and can be overwhelmed by a large number of visitors. Further, staff are required at each building or location.

Virtual receptionist systems as implemented today are cumbersome, have limited capabilities, and are difficult to use. Some virtual receptionists are unable to perform certain tasks or are limited to one type of interface, such as a telephone interface.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A virtual receptionist system with independent video conferencing is provided. The virtual receptionist system may provide remote receptionist services to remote locations within the same entity or to different business entities. The virtual receptionist may interact with a visitor at a cabinet as part of a synchronous interactive session comprising video and/or audio data, screen sharing, printing to the cabinet, and performing remote actions such as unlocking a door.

Unlike existing virtual receptionist systems, the present system has separate systems for managing the virtual receptionist(s) and for managing a video conferencing session. As such, less computing resources and bandwidth are used, especially when a visitor is queued to interact with a next available virtual receptionist. Further, because the video conferencing component is separate, a failure within the video conference does not cause the cabinet to lose connectivity with, or automatically terminate a session with, the virtual receptionist.

In some embodiments, an operator of the virtual receptionist system may instruct the cabinet to screen share or display a screen displayed at the virtual receptionist. The screen share feature may be used to, for example, display a map or other materials to the visitor. The virtual receptionist may further annotate the shared screen using one or more input methods. The annotations are then displayed at the cabinet. The virtual receptionist may instruct the cabinet to print the screen share and the accompanying annotations.

Computer System

A virtual receptionist system provides receptionist capabilities to one or more cabinets distributed over a geographical area, without placing a human receptionist at each cabinet location. The virtual receptionist system may be implemented in a variety of ways to perform one or more actions. After a session between a user of a cabinet and a human operator of a virtual receptionist application is established, a unified communication system may establish a video conferencing session between the two systems. The video conferencing session is established and maintained separately from the established session.

Figure 1:
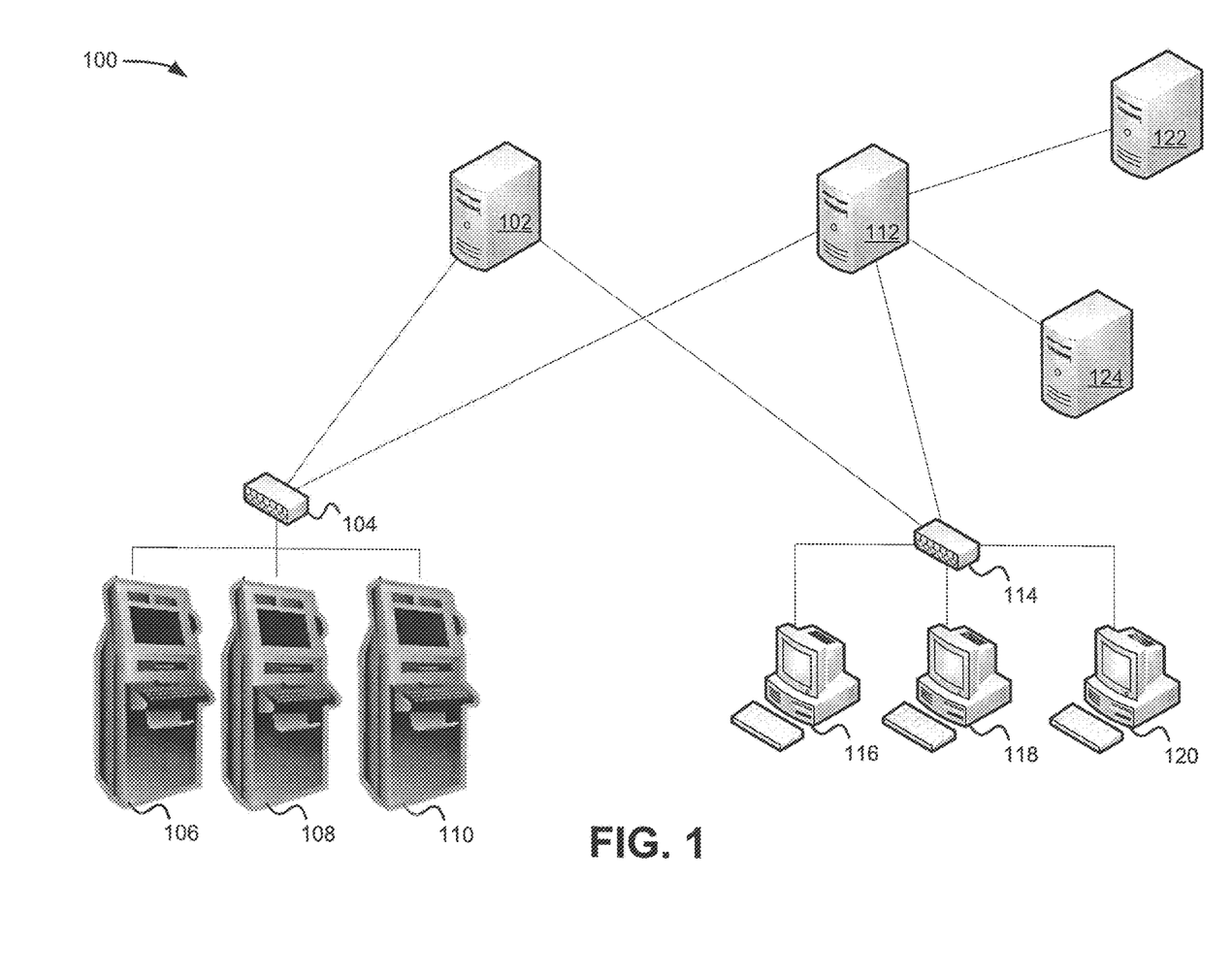
FIG. 1 is a diagram of a computer system for a virtual receptionist, according to various embodiments.

FIG. 1 is a diagram of a computer system 100 for a virtual receptionist computer system, according to various embodiments. The computer system 100 comprises a plurality of components including, but not limited to, a unified communication system (UCS) server 102 (video conferencing server), a cabinet router 104, a cabinets 106, 108, 110, a distribution server 112, a virtual receptionist router 114, virtual receptionists 116, 118, 120, a queuing server 122, and a storage server 124. The components of the computer system 100 are in electronic communication over one or more communications networks, via communication connections that may be secured or unsecured, depending upon a particular implementation. Examples of secure communication connections include encrypted communication channels.

The UCS server 102 establishes a video conferencing session between a specified one of the cabinets 106, 108, or 110 and a specified one or more of the virtual receptionist systems 116, 118, or 120. The UCS server 102 receives an instruction to establish the video conferencing session from the specified virtual receptionist system after the specified virtual receptionist is assigned conduct a session with the specified cabinet. The UCS server 102 is configured to establish a video, including audio, conferencing session using a video conferencing protocol, such as the User Datagram Protocol (UDP). The UCS server 102 may be co-located with, or remote from, one or more of the cabinets 106, 108, and 110 or one or more of the virtual receptionists 116, 118, and 120.

The cabinet router 104 routes and manages electronic communications between the cabinets 106, 108, and 110 and other elements. For example, the cabinet router 104 routes communications between the cabinets 106, 108, 110 and the UCS server 102 and the distribution server 112. The computer system 100 may include a plurality of cabinet routers, each of which being configured to manage communications for a subset of the cabinets in the computer system 100. The cabinet routers 104 may be co-located with at least a subset of the cabinets 106, 108, and 110 or may manage communications remotely.

The cabinets 106, 108, and 110 are used by visitors to interact with the virtual receptionists 116, 118, and 120. The cabinets 106, 108, and 110 are computing systems that are physically located remote from the virtual receptionists 116, 118, and 120. The cabinets 106, 108, and 120 execute one or more cabinet applications that provide the functionalities described herein. The respective cabinets may comprise input and output capabilities such as a display screen, a keyboard, a touchpad or touch screen, a video capture device, a microphone, speakers, a printing device, a scanner or image capture device for machine readable codes including bar codes and Quick Response (QR) codes, a motion detector, and special capabilities for accommodating persons with disabilities. The cabinets 106, 108, and 110 may be configured to communicate with the cabinet router 104 via a wired connection, such as an Ethernet connection, or via a wireless connection, such as a WiFi, 3G, or 4G connection. In some locations, Ethernet or WiFi connections may be unavailable or unreliable and a 3G or 4G connection may be used as a primary means of communication or as a back-up.

The cabinet application is configured to receive a request for a customer service interaction with a virtual receptionist 116, 118, or 120 from a user. The request is initiated by, for example, the user approaching the cabinet or by selecting an option to request the customer service interaction. The request includes a computer identifier (CID) of the cabinet and, optionally, an identifier of the entity or department that the visitor is visiting. The cabinet applications may receive instructions from the UCS server 102 and the distribution server 112 to establish, conduct, and terminate a customer service session. The cabinet applications may, in response to an instruction received from the distribution server 112, instruct the UCS server 102 to initiate a video conferencing session with a virtual receptionist 116, 188, or 120.

The distribution server 112 is configured to manage the cabinet 106, 108, and 110 and the virtual receptionists 116, 118, and 120. The distribution server 112 maintains status data of the virtual receptionists 116, 118, and 120 and the cabinets 106, 108, and 110. When a request is received from one of the cabinets, the distribution server 112 may assign an available virtual receptionist that is not currently in session with another cabinet to the cabinet. If there are no available virtual receptionists, the distribution server 112 queues the request by sending it to the queuing server 122. The distribution server 112 operates using the WebSocket protocol or other TCP-based protocol. For each customer service session, the distribution server 112 may establish two web socket sessions: between the distribution server 112 and the cabinet application and between the distribution server and the virtual receptionist. The distribution server 112 does not communicate directly with the UCS server 102.

The virtual receptionist router 114 routes and manages traffic between the virtual receptionists 116, 118, and 120 and other elements. For example, the virtual receptionist router 114 routes communications between the virtual receptionists and the UCS server 102 and the distribution server 112. The computer system 100 may include a plurality of virtual receptionist routers, each of which being configured to manage communications for a subset of the cabinets in the computer system 100. The virtual receptionist routers 114 may be co-located with at least a subset of the virtual receptionists 116, 188, and 120 or may manage communications remotely.

The virtual receptionists 116, 118, and 120 facilitate the provisioning of receptionist services at the cabinets 106, 108, and 110. The virtual receptionists 116, 118, and 120 execute a virtual receptionist application on computing devices operated by human users. The virtual receptionists are configured to accept an instruction from the distribution server 112 to initiate a customer service session. The virtual receptionist 116, 118, or 120 may communicate with the UCS server 102 to establish a video conferencing session between the cabinet 106, 108, or 110 and one or more virtual receptionists that will participate in the video conferencing session, which may include the virtual receptionist 116, 118, 120 that requested the videoconferencing session. The virtual receptionists 116, 118, and 120 perform one or more actions during a customer service session. Non-limiting examples of such actions include instructing a door to unlock; share, and make annotations to, a screen with the cabinet; and instruct the cabinet to print content such as a visitor badge or a map.

In some embodiments, such as where the virtual receptionists 116, 118, and 120 support more than one entity or department within an entity, the respective virtual receptionists are assigned to provide receptionist services for a subset of the business entities or departments. To illustrate, virtual receptionist 116 may be assigned to work with a first entity but not with a second entity. In these instances, the distribution server 112 selectively assigns the virtual receptionists to requests to initiate a customer service interaction with those entities or departments.

A queuing server 122 logs or tracks requests and may queue requests when there are no available virtual receptionists. The queuing server 122 receives requests to be queued from the distribution server 112. As virtual receptionists become available, by completing a customer service session or by beginning a shift, the distribution server 112 requests the next queued request. The queuing server 122 may accommodate instances where multiple business entities, each associated with a subset of the virtual receptionists or service levels, are supported. The queueing server 122 may further accommodate expediting certain requests, such as for Very Important Persons (VIPs) or routine tasks, such as unlocking a door for a known delivery person. These capabilities are described in further detail below.

The storage server 124 stores content such as user interface elements for the cabinets 106, 108, and 110, including electronic branding materials, such as themes, approved fonts, images, and logos. The distribution server 112 may access the content in response to receiving a request for a customer service interaction from one of the cabinets. The distribution server 112 may generate an entity- or department-specific user interface at the requesting cabinet.

The computer system 100 may be geographically dispersed or limited to a local area. The computer system 100 may include fewer or a greater number of components to perform the functionalities described herein. In addition, the elements in FIG. 1 are depicted as separate elements for purposes of discussion only and the functionality of the elements may be combined in any number of elements consistent with the description provided herein. For example, functionality of the distribution server 112, queuing server 122, storage server 124 may be provided by a single element or multiple elements.

Initiating Customer Service Sessions

Figure 2:
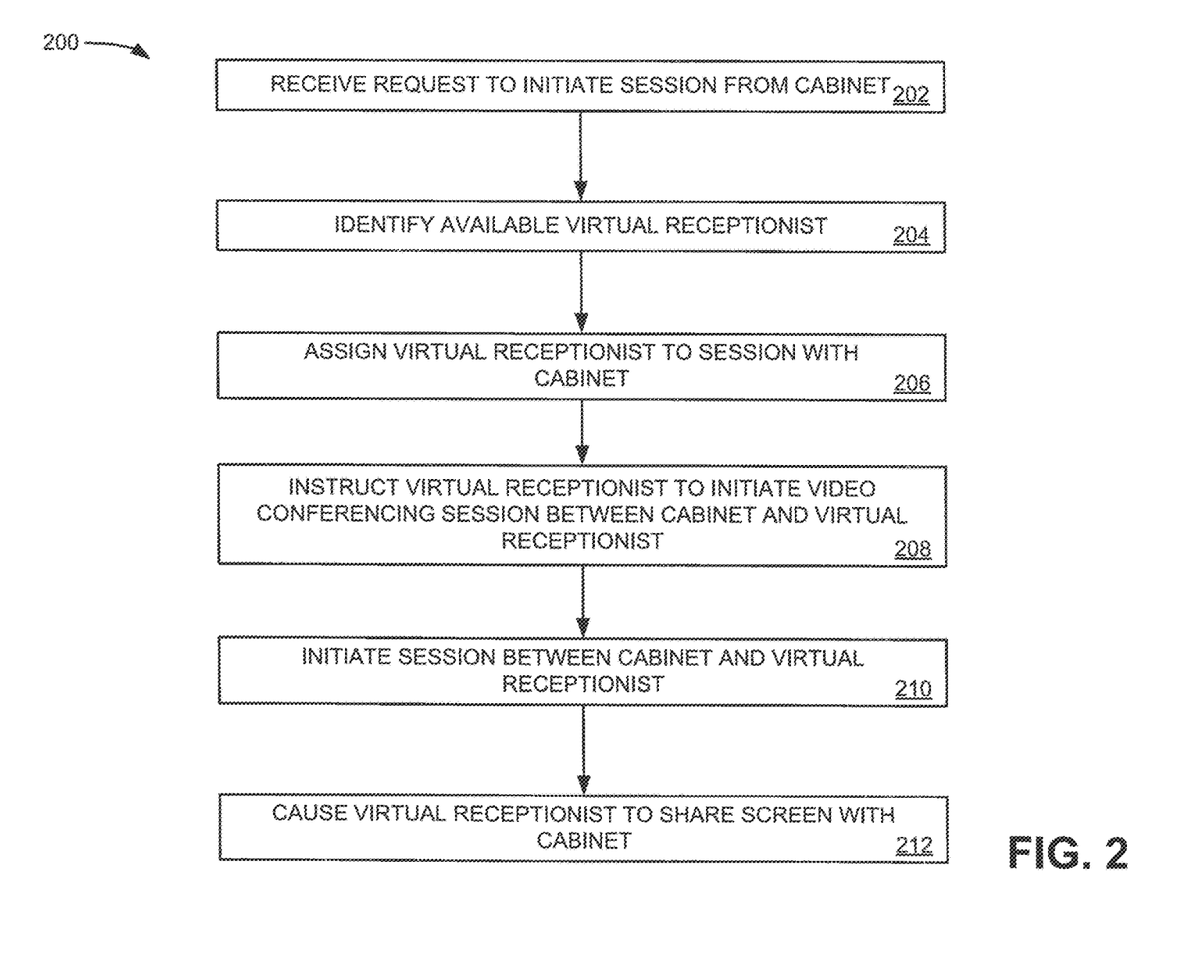
FIG. 2 is a flowchart of a method of establishing a synchronous communications session using a virtual receptionist, according to various embodiments.

FIG. 2 is a flowchart of a method 200 of establishing a synchronous communications session using a virtual receptionist system, according to various embodiments. The method 200 is performed by the distribution server 112. The method 200 separately establishes a connection to a requesting cabinet and an assigned virtual receptionist. This allows the distribution server 112 to queue requests, to allocate requests based on entity or department, and to prioritize some requests over others. The method 200 further facilitates establishing a video conferencing session between the virtual receptionist and the cabinet via the UCS server 102, without directly participating in the establishment, maintenance, or termination of the video conferencing system.

In an operation 202, the distribution server 112 receives a request to initiate an interactive session from a cabinet 106. The request to initiate may be generated by the cabinet 106 in response to detecting motion, capturing a bar code or other computer-readable code or graphic, or a touch at the cabinet. Where one or more requests are queued by the queueing server 122, the distribution server 112 may retrieve the request from the queue. When the cabinet is not currently in session, a welcome page is displayed. In instances where the same cabinet 106 supports two or more business entities or departments, a first welcome page may display a menu of the two or more business entities or departments. Upon receiving a selection of the particular entity from a user of the cabinet, a second welcome page specific to the particular entity may be displayed by the cabinet. The second welcome page may be retrieved by the distribution sever 112 from the storage server 124.

The distribution server 112 establishes a connection to the cabinet 106. This may be accomplished, for example, by establishing a WebSocket connection. Once a connection is established, a connecting page or waiting page is displayed at the cabinet 106. The connecting page indicates that the request has been received and that a session is being established with an available virtual receptionist. The waiting page indicated that the request has been received and that the request has been queued until a virtual receptionist becomes available.

In some embodiments, the request is associated with a particular visitor. For example, some cabinets may be configured with image capture devices capable of capturing images usable in reading computer-readable codes or for facial recognition. Some cabinets may have magnetic stripe or RFID readers for reading computer-readable code stored therein. The distribution server 112 (or another server not depicted) may perform facial recognition on the image and identify the visitor from a set of expected visitors and the request may be expedited if the visitor is identified by matching the face, name, or other identifier to a stored list of expected visitors. In some embodiments, the identified visitor may be known to the distribution server 112 as a regular visitor, such as a contract worker or a delivery person. In these cases, in response to the request and the identification, the distribution server 112 may automatically, without human intervention, perform one or more actions, such as unlocking a door. In some instances, the particular visitor may be recognized as an unwelcome visitor. In these instances, instead of continuing with method 200, appropriate action such as notifying security personnel or preventing a door from being unlocked by another virtual receptionist may be initiated.

The request received by the distribution server 112 comprises at least a computer identifier (CID) of the cabinet 106 initiating the request. The request may be implemented using a wide variety of formats that may vary depending upon a particular implementation and embodiments are not limited to any particular request format. The request may include additional information beyond the CID of the cabinet 106 initiating the request. For example, depending upon the location of the cabinet 106, the request may further comprise an entity or department identifier or other information that may be used by the distribution server 112 to assign an available virtual receptionist. In some embodiments, the request may include time stamp data, authentication data, etc.

In an operation 204, the distribution server 112 identifies an available virtual receptionist 116. The available virtual receptionist 116 may be any virtual receptionist not currently in session or a virtual receptionist who is qualified to provide services for a specified entity or department that is not currently in session. The available virtual receptionist 116 may be identified by virtue of having terminated another session with a different cabinet 108.

In an operation 206, when the available virtual receptionist 116 is identified, the distribution server 112 assigns the virtual receptionist 116 to the session by passing the CID of the cabinet 106 to the virtual receptionist 116. In some embodiments, the distribution server 112 is configured to establish a WebSocket connection with the virtual receptionist 116.

In an operation 208, the distribution server 112 may optionally instruct the virtual receptionist 116 to initiate a video conferencing session between the cabinet 106 and the virtual receptionist 116. In some embodiments, the operation 208 is initiated and performed solely by the virtual receptionist 116 in response to receiving the CID of the cabinet 106. In other embodiments, the distribution server 112 may instruct the cabinet 106 to instruct the UCS server 102 to initiate a video conferencing session between the cabinet 106 and the virtual receptionist 116.

To establish a video conferencing session between the cabinet 106 and the virtual receptionist 116, their respective CIDs are sent to the UCS server 102. For example, the virtual receptionist 116 may provide its CID and the CID of the cabinet 106 to UCS server 102. Alternatively, the cabinet 106, upon receiving an acknowledgment from the virtual receptionist 116 via the distribution server 112, may send its CID and the CID of the virtual receptionist 116 to the UCS server 102. In some embodiments, the cabinet 106 sends its CID to UCS server 102 at the time of the request in the operation 202 and the virtual receptionist 116 sends its CID and the cabinet 106 CID to the UCS server 102. The UCS server 102, in response to receiving both CIDs establishes a video conferencing session between the two devices. The video conferencing session runs concurrently with the customer service session initiated by the distribution server 112 but is wholly separate from that session. Thus, if one session fails, the other session persists.

In an operation 210, the distribution server 112 initiates the customer service session between the cabinet 106 and the virtual receptionist 116. The customer service session allows the two devices to communicate electronically, except for video conferencing which is provided by the UCS server 102. The customer service session facilitates certain actions, such as Voice Over Internet Protocol (VOIP) communications, electronically unlocking doors, providing signature for deliveries, printing at the cabinets, and screen sharing of the virtual receptionist 116 with the cabinet 106.

In an optional operation 212, during the customer service session, the virtual receptionist 116 may cause at least a portion of a screen at the virtual receptionist 116 to be displayed at the cabinet 106, referred to as "screen sharing". The shared screen is re-created at the cabinet 106. The shared screen may be used, for example, to display a map of the area local to the cabinet 106. The user of the virtual receptionist 116, using a touch pad or other input device, may annotate the shared screen. The annotations may include a highlight of a route to the visitor's destination.

In some embodiments, the virtual receptionist 116 may instruct the cabinet 106 to print a document using a printing device local to the cabinet 106. The printing device may be incorporated into the cabinet 106, or located in proximity to the cabinet 106. In some instances, the printing device is associated with an email address from which it can render and print an emailed document. Examples of emailed documents include, without limitation, annotated or unannotated maps, badges, or the like.

The customer service session is terminated upon instruction from the cabinet 106 or the virtual receptionist 116. In some embodiments, the customer session may terminate automatically after a period of time has elapsed or after an action, such as unlocking a door, is performed. The video conferencing session may be terminated by the cabinet 106 or the virtual receptionist 116 when the customer service session is terminated. Upon termination, the cabinet 106 may display a "thank you" page to indicate to the user that the session is terminated.

Virtual Receptionist Interface

Figure 3:
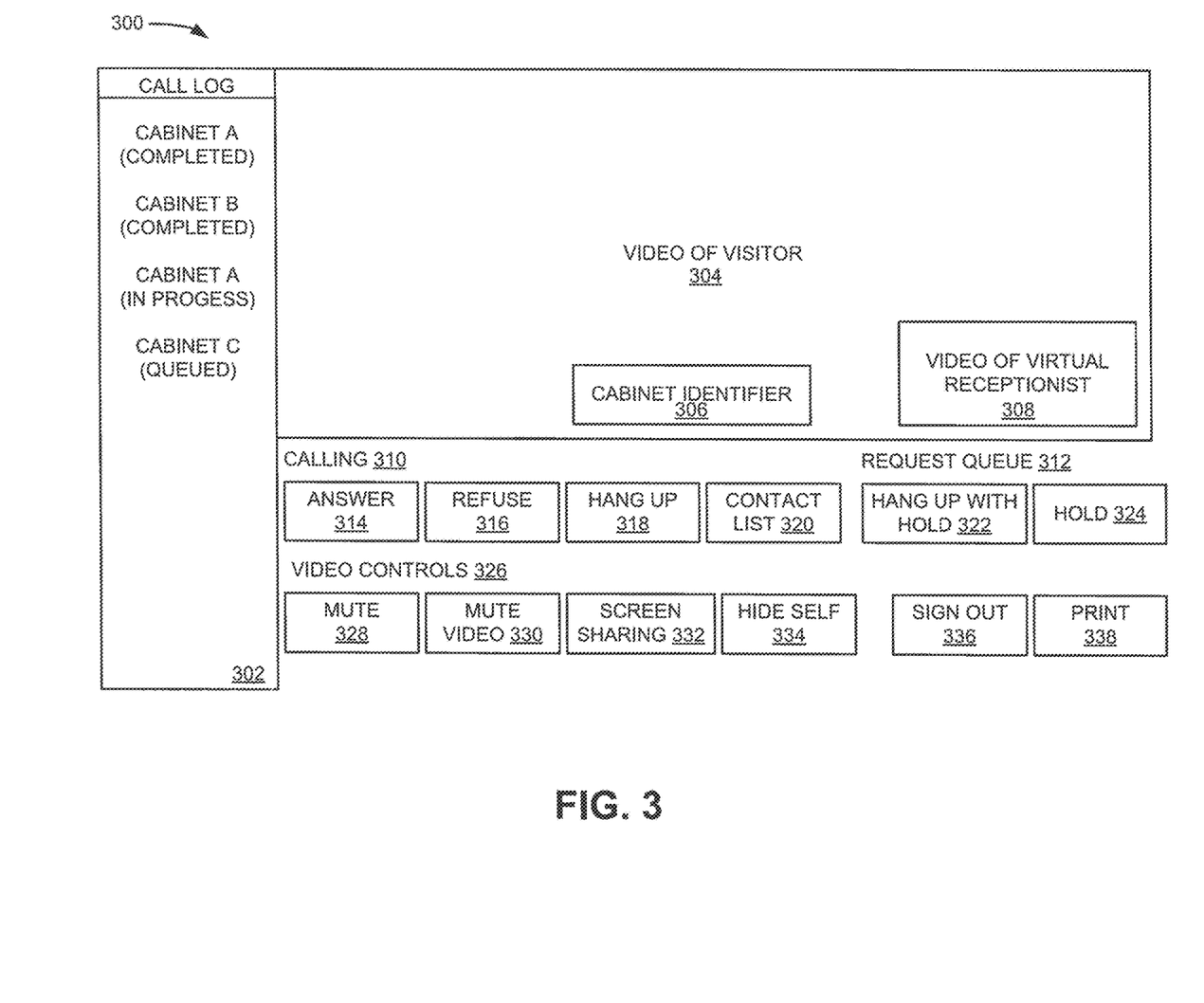
FIG. 3 is a portion of a user interface within a virtual receptionist system, according to various embodiments.

FIG. 3 is a portion of a user interface 300 within a virtual receptionist, according to various embodiments. The user interface 300 may be displayed at the virtual receptionist 116 while the video conferencing session and the customer service session are concurrently running between the virtual receptionist 116 and the cabinet 106. The user interface 300 is broken into portions that display data from the UCS server 102 and the distribution server 112. As depicted, the user interface 300 comprises a touch screen interface but other interfaces may also be used.

A call log 302 comprises a listing, by cabinet identifier, of completed sessions, current session(s), and/or queued sessions and their respective statuses. The call log may include further information, such as an entity or department associated with the session, a geographic location of the cabinet, or a VIP status of the visitor.

A video feed 304 depicts the visitor at the cabinet 106. The video feed 304 is provided as part of the video conferencing session. A cabinet identifier 306 may identify the cabinet 106 and include other information about the cabinet or the visitor (if identified). A video feed 308 of the virtual receptionist is optionally provided as part of the video conferencing session and as a cue to the user of the virtual receptionist to look into the video camera at the virtual receptionist.

When there is no screen shared, as part of the video conferencing session, the cabinet 106 may display the video feed 304 and the video feed 308 to the visitor, where the size and relative placement of the video feeds are interchanged.

The user interface 300 comprises a set of menu options grouped into a calling menu 310, a request queue 312, and video controls 326. The user of the virtual receptionist 116 may select these options to instruct the distribution server 112 to perform one or more tasks. Other options may be included but are not depicted such as unlocking a door and signing for a package.

In the calling menu 310, an answer option 314 allows the user to accept an assigned session from the distribution server 112. A refuse option 316 allows the user to refuse the assigned session from the distribution server 112, causing the request to be queued by the queueing server 122. A hang up option 318 allows the user to terminate the customer service session and the video conferencing session. A contact list option 320 allows the user to search a contact list associated with the cabinet 106 for details about a person meeting the visitor or expecting the visitor. The contact list 320 allows the receptionist to initiate a call manually or to interact with a host via a three way conference call or email.

The request queue 312 comprises a "hang up with hold" option 322 that allows the user to terminate the sessions and put the visitor on hold and to perform other actions, such as contacting third person, such as a person in proximity to the cabinet 106 or to redirect the visitor to another virtual receptionist 116, 118, 120. A hold option 324 does not terminate the sessions and allows the user to re-join the sessions after performing the actions.

The video controls 326 are controlled by the UCS server 103. A mute option 328 that temporarily mutes the voice of the user of the virtual receptionist 116. A mute video option 330 temporarily stops transmission of the video feed 308 of the virtual receptionist to the cabinet 106. A screen sharing option 332 instructs the UCS server 332 to switch from the video feed 308 to displaying a portion of a display at the virtual receptionist 116. The virtual receptionist can share a window of a running application or an entire desktop. A "hide self" option 334 temporarily removes the virtual receptionist's video feed from the picture in picture display on the receptionist's video window.

The user interface 300 further includes a sign out option 336 using that allows a user to indicate that they are no longer available if, for example, they have a work break or is ending their shift. A print option 338 causes the printing device at the cabinet 106 to print a screen share or other document such as a security badge.

Entity-Specific Interfaces

Figure 4:
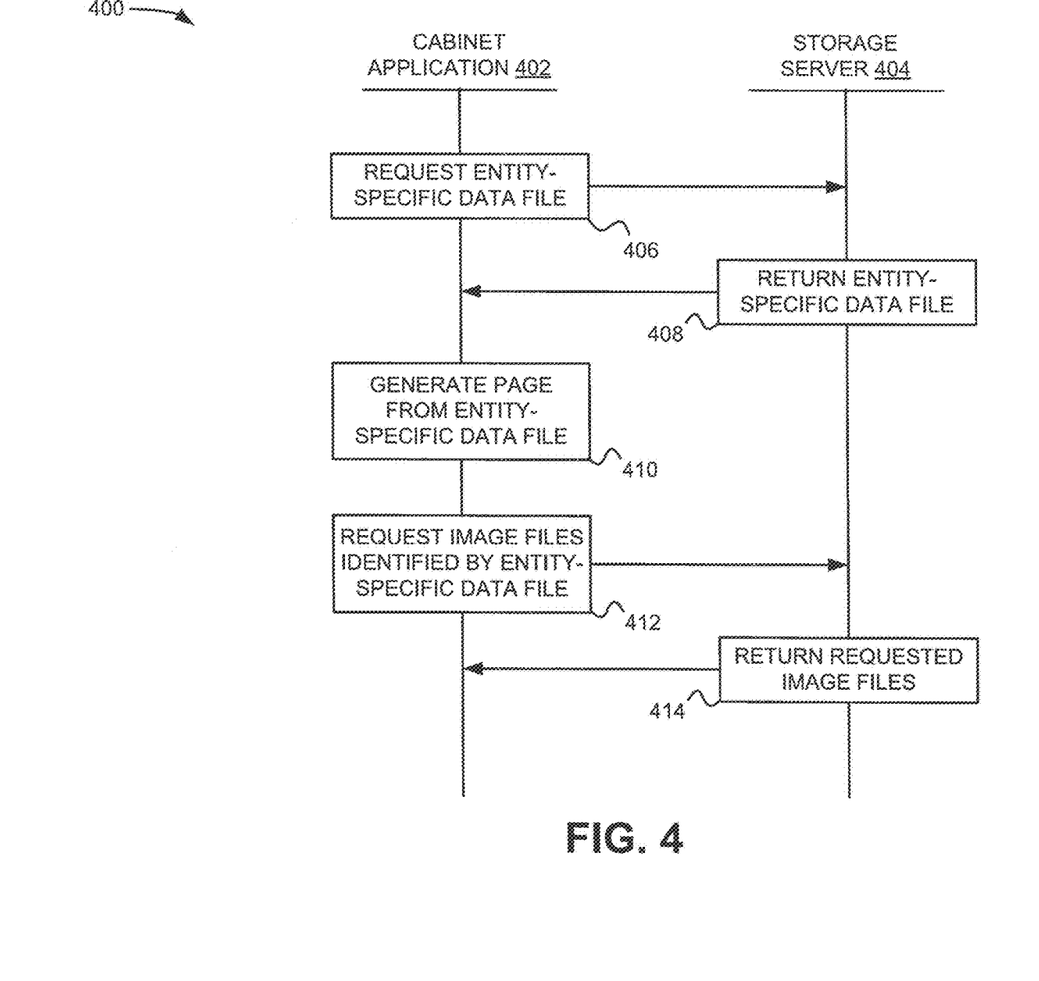
FIG. 4 is a diagram of communications used to establish a virtual receptionist system, according to some embodiments.

FIG. 4 is a diagram 400 of communications used to establish a virtual receptionist system, according to some embodiments. The communications are conducted by a cabinet application 402 and a storage server 404 via the distribution server 112 (not depicted). The communications allow the cabinet 106 to display entity- or department-specific interfaces using graphics and other interface elements stored at the storage server 124. The communications may be performed to generate a welcome page, a waiting page, an in-session page, and/or a thank you page.

In operation 406, the cabinet application 402 requests an entity-specific data file. The request may be generated by the distribution server 112 in response to the request received from the cabinet application 402. The request 406 identifies the entity and the CID of the cabinet application 402. The data file includes a portion of the interface elements, such as layout and theme elements. In operation 408, the storage server 404 returns the entity-specific data file to the cabinet application.

In operation 410, the cabinet application 402 generates the page from the entity-specific data file of operation 408. In an operation 412, the cabinet application 402 requests image files identified by the entity-specific data file. In an operation 414, the storage server 404 returns the requested image files.

Queueing of Requests

Figure 5:
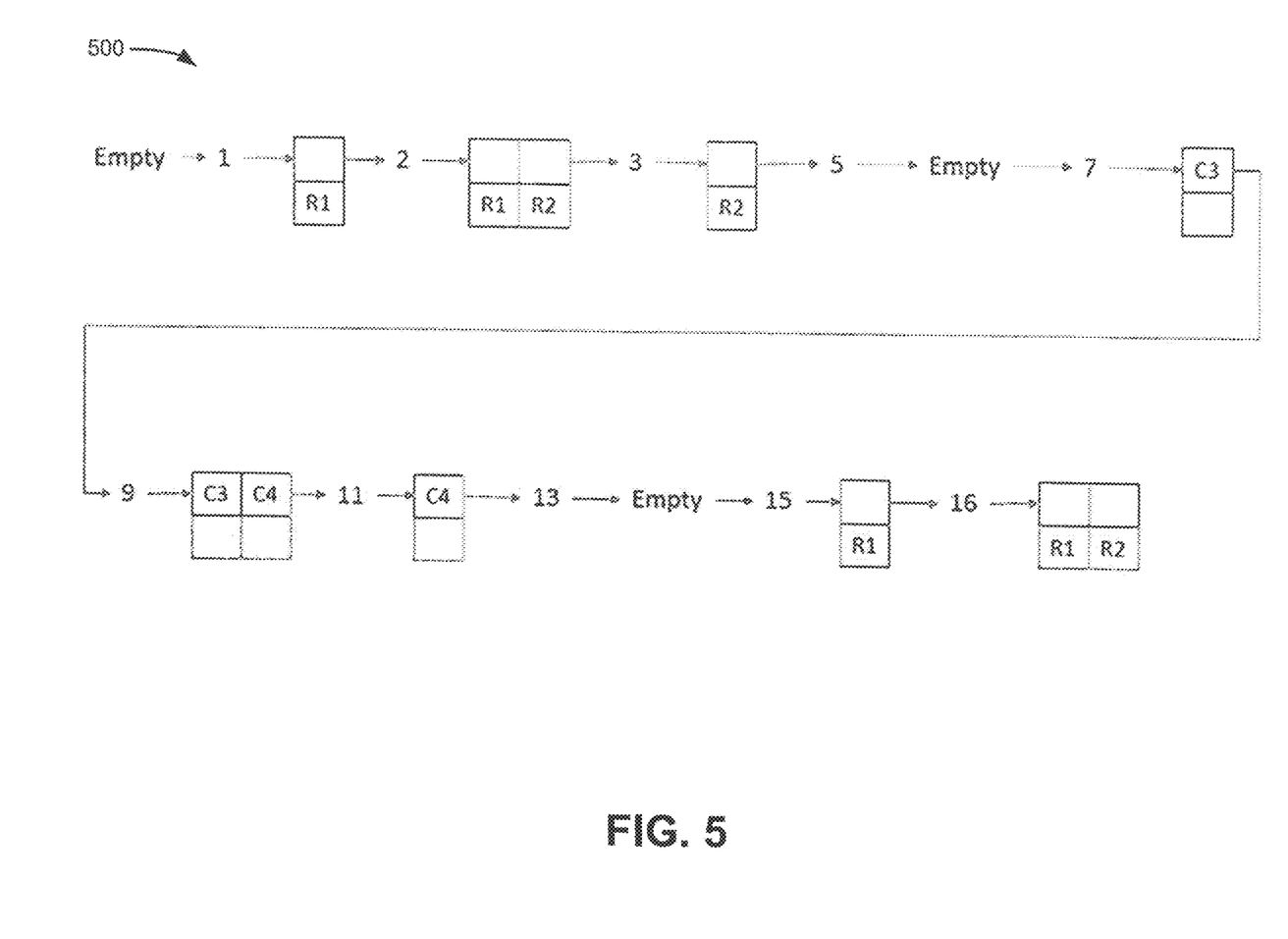
FIG. 5 is an example queue used to queue virtual receptionists and requests for a synchronous communications session, according to various embodiments.

FIG. 5 is an example queue 500 used to queue virtual receptionists and requests for a synchronous communications session received from the cabinets, according to various embodiments. In some instances, the queuing server 122 maintains a separate queue 500 for each entity or department supported by the virtual receptionists 116, 118, and 120.

At each stage in the queue, a single queue element has two slots. As depicted, the top slot is used to track queued cabinet requests and the bottom slot is used to track available virtual receptionists. In the example queue 500, there are two virtual receptionists, R1 and R2, and four cabinet applications, C1, C2, C3, and C4.

The queue 500 begins in an empty state, indicating that there are no queued requests and no available virtual receptionists. At stage 1, virtual receptionist R1 becomes available. At stage 2, virtual receptionist R1 is still available and virtual receptionist R2 becomes available.

At stage 3, virtual receptionist R1 is assigned to a request and is no longer available, meaning that virtual receptionist R2 is still available. At stage 5, virtual receptionist R2 is assigned to a request and is no longer available, nor is virtual receptionist R1, thus, the queue 500 is empty.

At stage 7, because no virtual receptionists are available, a new request from cabinet C3 is received and added to the queue 500. At stage 9, because no virtual receptionists are available, a second new request from cabinet C4 is received and added to the queue 500. In instances where the request from cabinet C4 is expedited, the new request can be placed in the queue 500 ahead of the previous request received from cabinet C3.

At stage 11, the session of virtual receptionist R1 is terminated and the request from cabinet C3 is assigned to virtual receptionist R1, thus the corresponding request is removed from the queue 500. At stage 13, the session of virtual receptionist R2 is terminated and the request from cabinet C4 is assigned to virtual receptionist R2, thus the corresponding request is removed from the queue 500, leaving queue 500 empty.

At stage 15, the session of virtual receptionist R1 is terminated and there are no queued requests in the queue 500, the virtual receptionist R1 is added to the queue 500, indicating that the virtual receptionist R1 is now available. At stage 17, the session of virtual receptionist R2 is terminated and there are no queued requests in the queue 500, the virtual receptionist R2 is added to the queue 500, indicating that the virtual receptionists R1 and R2 are now available.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
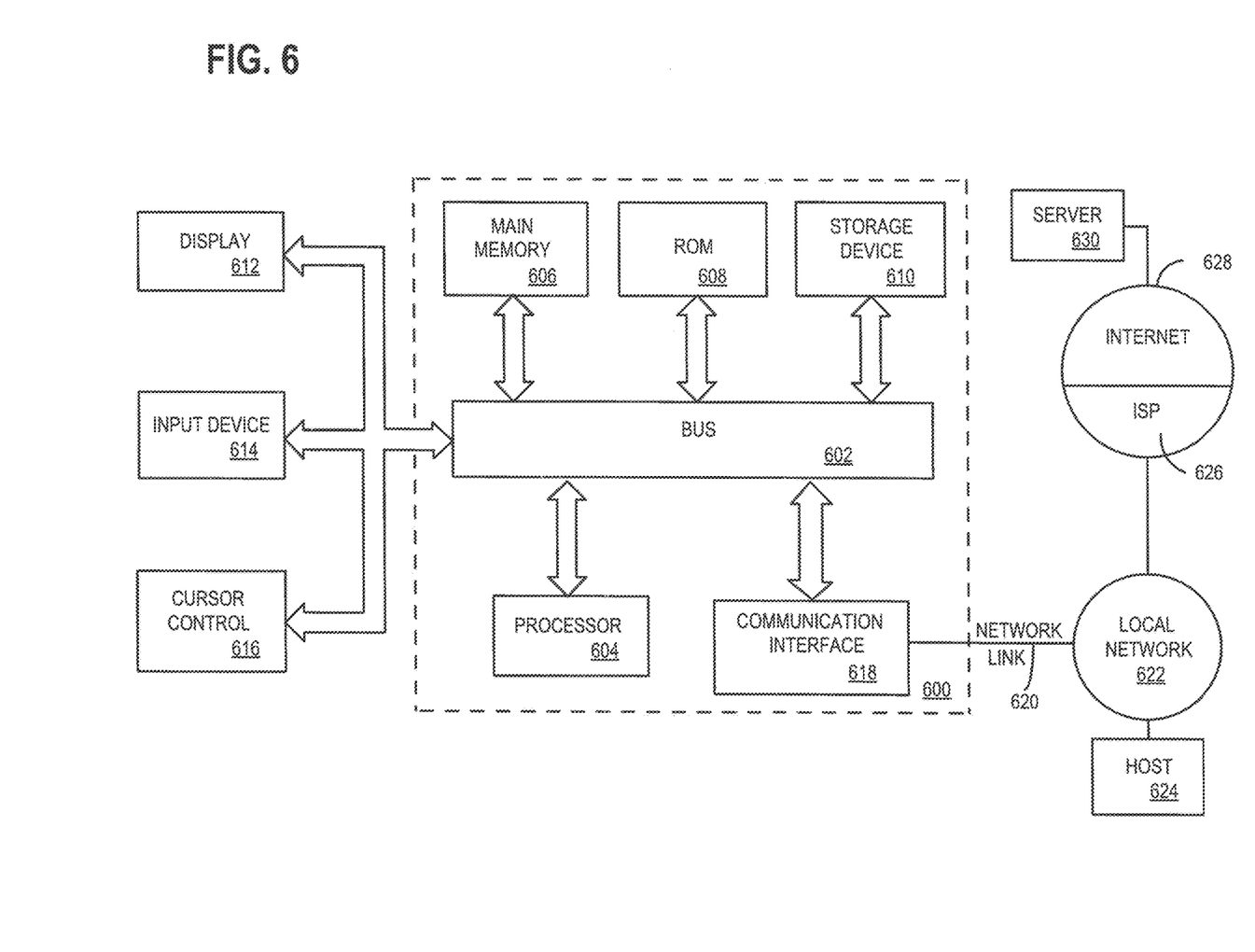
FIG. 6 is a block diagram that illustrates a computer system upon which an embodiment may be implemented.

For example, FIG. 6 is a block diagram that illustrates a computer system 600 upon which an embodiment may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method providing an improvement in customer service sessions implemented over computer networks, the method comprising:
    a distribution server receiving, via one or more computer networks from a cabinet application executing on a computing device, a request to initiate a customer service session between the cabinet application executing on the computing device and a virtual receptionist application to provide virtual receptionist services to a user of the cabinet application executing on the computing device, the request including a computer identifier (CID) of the cabinet application executing on the computing device;
    the distribution server, selecting a particular virtual receptionist application from a plurality of virtual receptionist applications executing on one or more computing devices to provide virtual receptionist services to the user of the cabinet application executing on the computing device;
    the distribution server, assigning the particular virtual receptionist application to a customer service session with the cabinet application executing on the computing device and providing the CID of the cabinet application executing on the computing device to the particular virtual receptionist application;
    the distribution server establishing the customer service session between the particular virtual receptionist application and the cabinet application;
    the distribution server instructing the cabinet application executing on the computing device to instruct a video conferencing server, that is separate from the distribution server and the computing device, to establish a video conferencing session between the cabinet application executing on the computing device and the particular virtual receptionist application, wherein in response to receiving the instruction from the distribution server, the cabinet application executing on the computing device provides the CID of the cabinet application and a CID of the particular virtual receptionist application to the videoconferencing server, wherein the video conferencing session and the customer service session run concurrently;
    wherein the method is performed using one or more processors.

2. The method of claim 1, further comprising:
    the distribution server receiving, from a second cabinet application executing on a second computing device, a second request to establish a second customer service interaction, the second request including a CID of the second cabinet application executing on a second computing device;
    the distribution server determining that the particular virtual receptionist application is assigned to the customer service session with the cabinet application executing on the computing device and is unavailable for assignment to the second cabinet application;
    in response to determining that the particular virtual receptionist application is assigned to the customer service session with the cabinet application executing on the computing device and is unavailable for assignment to the second cabinet application, the distribution server adding the second request to a request queue.

3. The method of claim 2,
the distribution server determining that the customer service session between the particular virtual receptionist application and the cabinet application is terminated;
the distribution server determining that the particular virtual receptionist application is available;
the distribution server, assigning the particular virtual receptionist application to a second customer service session with the second cabinet application executing on the second computing device and providing the CID of the second cabinet application to the particular virtual receptionist application;
the distribution server instructing the particular virtual receptionist application to transmit the CID of the second cabinet application and a CID of the particular virtual receptionist application to the video conferencing server, thereby instructing the video conferencing server to initiate a video conferencing session between the second cabinet application and the particular virtual receptionist application;
the distribution server, initiating the second customer service session between the particular virtual receptionist application and the second cabinet application.

4. The method of claim 2, further comprising:
the distribution server, receiving from the cabinet application executing on the computing device, a third request for an identifier of a user of a third cabinet application, the identifier obtained using facial recognition;
using the distribution server, determining that the user of the third cabinet application has a higher priority than a user of the second cabinet application;
in response to determining that the user of the third cabinet application has a higher priority than the user of the second cabinet application, adding the third request to the request queue in front of the second request.

5. The method of claim 2, wherein:
the request queue comprises a plurality of queue elements,
each queue element, from the plurality of queue elements, includes a first slot containing cabinet application data of cabinet applications having submitted a request and a second slot containing available receptionist application data that indicates virtual receptionist applications that are not currently assigned to a cabinet application.

6. The method of claim 1, further comprising:
determining that the cabinet application is located at a first entity of a plurality of entities; and
causing the cabinet application to request a data file from a storage server and to generate a page view associated with the first entity at the cabinet application from the data file.

7. The method of claim 6, wherein the particular virtual receptionist application is associated with the first entity of the plurality of entities.

8. The method of claim 1, wherein a user of the cabinet application is geographically remote from a user of the particular virtual receptionist application.

9. The method of claim 1, further comprising, during the customer service session, using the video conferencing server, displaying at least a portion of a screen of the particular virtual receptionist application at the cabinet application executing on the computing device.

10. An apparatus providing an improvement in customer service sessions implemented over computer networks, the apparatus comprising:
one or more processors; and
a non-transitory computer readable medium having instructions stored thereon, wherein processing of the instructions by the one or more processors, cause:
receiving, from a cabinet application executing on a computing device, a request to initiate a customer service session between the cabinet application executing on the computing device and a virtual receptionist application to provide virtual receptionist services to a user of the cabinet application executing on the computing device, the request including a computer identifier (CID) of the cabinet application;
selecting a particular virtual receptionist application from a plurality of virtual receptionist applications executing on one or more computing devices to provide virtual receptionist services to the user of the cabinet application executing on the computing device;
assigning the particular virtual receptionist to a customer service session with the cabinet application executing on the computing device and providing the CID of the cabinet application executing on the computing device to the particular virtual receptionist application;
establishing the customer service session between the particular virtual receptionist application and the cabinet application;
the distribution server instructing the cabinet application executing on the computing device to instruct a video conferencing server, that is separate from the distribution server and the computing device, to establish a video conferencing session between the cabinet application executing on the computing device and the particular virtual receptionist application, wherein in response to receiving the instruction from the distribution server, the cabinet application executing on the computing device provides the CID of the cabinet application and a CID of the particular virtual receptionist application to the videoconferencing server, wherein the video conferencing session and the customer service session run concurrently.

11. The system of claim 10, wherein processing of the instructions further causes:
receiving, from a second cabinet application executing on a second computing device, a second request to initiate a second customer service interaction, the second request including a CID of the second cabinet application executing on the computing device;
determining that the particular virtual receptionist application is assigned to the customer service session with the cabinet application executing on the computing device and is unavailable for assignment to the second cabinet application;
in response to determining that the particular virtual receptionist application is assigned to the customer service session with the cabinet application executing on the computing device and is unavailable for assignment to the second cabinet application, adding the second request to a request queue.

12. The system of claim 11, wherein processing of the instructions further causes:
determining that the customer service session between the particular virtual receptionist application and the cabinet application is terminated;
determining that the particular virtual receptionist application is available;

assigning the available virtual receptionist application to a second customer service session with the second cabinet application executing on the second computing device and providing the CID of the second cabinet application to the particular virtual receptionist application;

instructing the particular virtual receptionist application to transmit the CID of the second cabinet application and a CID of the particular virtual receptionist application to the video conferencing server, thereby instructing the video conferencing server to initiate a video conferencing session between the second cabinet application and the particular virtual receptionist application;

initiating the second customer service session between the particular virtual receptionist application and the second cabinet application.

13. The system of claim 11, wherein processing of the instructions further causes:

receiving, from the cabinet application executing on the computing device, a third request for an identifier of a user of a third cabinet application, the identifier obtained using facial recognition;

determining that the user of the third cabinet application has a higher priority than a user of the second cabinet application;

in response to determining that the user of the third cabinet application has a higher priority than the user of the second cabinet application, adding the third request to the request queue in front of the second request.

14. The system of claim 11, wherein:

the request queue comprises a plurality of queue elements, each queue element, from the plurality of queue elements, includes a first slot containing cabinet application data of cabinet applications having submitted a request and a second slot containing available receptionist application data that indicates virtual receptionist applications that are not currently assigned to a cabinet application.

15. The system of claim 10, wherein processing of the instructions further causes:

determining that the cabinet application is located at a first entity of a plurality of entities; and causing the cabinet application to request a data file from a storage server and to generate a page view associated with the first entity at the cabinet application from the data file.

16. The system of claim 15, wherein the particular virtual receptionist application is associated with the first entity of the plurality of entities.

17. The system of claim 10, wherein a user of the cabinet application is geographically remote from a user of the particular virtual receptionist application.

18. The system of claim 10, wherein processing of the instructions further causes, during the customer service session:

displaying at least a portion of a screen of the particular virtual receptionist application at the cabinet application executing on the computing device.

19. One or more non-transitory computer-readable media providing an improvement in customer service sessions implemented over computer networks, the one or more non-transitory computer-readable media storing instructions which, when processed by one or more processors, cause:

a distribution server, receiving, via one or more computer networks from a cabinet application executing on a computing device, a request to initiate a customer service session between the cabinet application executing on the computing device and a virtual receptionist application to provide virtual receptionist services to a user of the cabinet application executing on the computing device, the request including a computer identifier (CID) of the cabinet application executing on the computing device;

the distribution server, selecting a particular virtual receptionist application from a plurality of virtual receptionist applications executing on one or more computing devices to provide virtual receptionist services to the user of the cabinet application executing on the computing device;

the distribution server, assigning the particular virtual receptionist application to a customer service session with the cabinet application executing on theft computing device and providing the CID of the cabinet application executing on the computing device to the particular virtual receptionist application;

the distribution server establishing the customer service session between the particular virtual receptionist application and the cabinet application;

the distribution server instructing the cabinet application executing on the computing device to instruct a video conferencing server, that is separate from the distribution server and the computing device, to establish a video conferencing session between the cabinet application executing on the computing device and the particular virtual receptionist application, wherein in response to receiving the instruction from the distribution server, the cabinet application executing on the computing device provides the CID of the cabinet application and a CID of the particular virtual receptionist application to the videoconferencing server, wherein the video conferencing session and the customer service session run concurrently.

20. The one or more non-transitory computer-readable media of claim 19, further comprising additional instructions which, when processed by the one or more processors, cause:

the distribution server receiving, from a second cabinet application executing on a second computing device, a second request to establish a second customer service interaction, the second request including a CID of the second cabinet application executing on a second computing device;

the distribution server determining that the particular virtual receptionist application is assigned to the customer service session with the cabinet application executing on the computing device and is unavailable for assignment to the second cabinet application;

in response to determining that the particular virtual receptionist application is assigned to the customer service session with the cabinet application executing on the computing device and is unavailable for assignment to the second cabinet application, the distribution server adding the second request to a request queue.

* * * * *